United States Patent
Huang et al.

(10) Patent No.: US 10,270,166 B2
(45) Date of Patent: Apr. 23, 2019

(54) RADAR AND METHOD FOR SWITCHING TO ENABLE ARRAY ANTENNA

(71) Applicant: Wistron NeWeb Corp., Hsinchu (TW)

(72) Inventors: Guo-Shu Huang, Hsinchu (TW); Jeng-Da Li, Hsinchu (TW); Hsin-Lung Hsiao, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 361 days.

(21) Appl. No.: 15/132,253

(22) Filed: Apr. 19, 2016

(65) Prior Publication Data

US 2016/0365631 A1    Dec. 15, 2016

(30) Foreign Application Priority Data

Jun. 10, 2015   (TW) .............................. 104118753 A

(51) Int. Cl.
*H01Q 21/12* (2006.01)
*H01Q 3/34* (2006.01)
(Continued)

(52) U.S. Cl.
CPC .............. *H01Q 3/34* (2013.01); *G01S 13/86* (2013.01); *G01S 13/931* (2013.01); *H01Q 21/12* (2013.01);
(Continued)

(58) Field of Classification Search
CPC ................... G01S 13/86; G01S 13/931; G01S 2013/0245; G01S 2013/9332;
(Continued)

(56) References Cited

U.S. PATENT DOCUMENTS

| 2014/0035780 A1* | 2/2014 | Trotta ................... G01S 13/426 342/175 |
| 2014/0255805 A1 | 9/2014 | Wang et al. |

(Continued)

FOREIGN PATENT DOCUMENTS

| CN | 101604015 | 12/2009 |
| CN | 101813764 | 8/2012 |

(Continued)

OTHER PUBLICATIONS

"Office Action of China Counterpart Application," dated Mar. 20, 2018, p. 1-p. 8.
(Continued)

*Primary Examiner* — Timothy A Brainard
(74) *Attorney, Agent, or Firm* — JCIPRNET

(57) ABSTRACT

A radar and a method for enabling array antenna are proposed. The radar includes a transceiver, a multi-input multi-output (MIMO) array antenna, a phased array antenna, and a controller. The MIMO array antenna is coupled to the transceiver and includes first transmitting sub-arrays and receiving sub-arrays. The phased array antenna is coupled to the transceiver and includes second transmitting sub-arrays and the receiving sub-arrays. The controller is coupled to the transceiver and configured to to enable the first transmitting sub-arrays to form the MIMO array antenna or enable the second transmitting sub-arrays to form the phased array antenna.

13 Claims, 6 Drawing Sheets

(51) Int. Cl.
*H04B 7/0413* (2017.01)
*G01S 13/86* (2006.01)
*G01S 13/93* (2006.01)
*G01S 13/02* (2006.01)

(52) U.S. Cl.
CPC .... *H04B 7/0413* (2013.01); *G01S 2013/0245* (2013.01); *G01S 2013/9332* (2013.01); *G01S 2013/9353* (2013.01); *G01S 2013/9357* (2013.01); *G01S 2013/9378* (2013.01)

(58) Field of Classification Search
CPC ..... G01S 2013/9353; G01S 2013/9357; G01S 2013/9378; H01Q 21/12; H01Q 3/34; H04B 7/0413
USPC .......................................................... 342/81
See application file for complete search history.

(56) References Cited

U.S. PATENT DOCUMENTS

2014/0347211 A1 11/2014 Schoor et al.
2014/0369438 A1* 12/2014 Lastinger ............. H04B 7/0495
375/267

FOREIGN PATENT DOCUMENTS

CN 104345311 2/2015
TW 201318440 5/2013

OTHER PUBLICATIONS

"Office Action of Taiwan Counterpart Application", dated Feb. 17, 2016, p. 1-p. 5.

* cited by examiner

RADAR AND METHOD FOR SWITCHING TO ENABLE ARRAY ANTENNA

CROSS-REFERENCE TO RELATED APPLICATION

This application claims the priority benefit of Taiwan application serial no. 104118753, filed on Jun. 10, 2015. The entirety of the above-mentioned patent application is hereby incorporated by reference herein and made a part of this specification.

BACKGROUND OF THE INVENTION

1. Field of the Invention

The present invention relates to radar and a method for enabling an array antenna.

2. Description of Related Art

An array antenna is an antenna system composed of a plurality of the same antennas arranged according to a particular pattern and is widely used in radar systems, such as a microwave/millimeter wave radar system. In conventional techniques, the antenna array may be implemented as a multiple input multiple output (MIMO) array antenna or a phased array antenna.

In conventional techniques, the MIMO array antenna may transmit, for example, a signal by a method of delaying the transmitting time. And, a receiving terminal of the MIMO array antenna may identify the signal reflected from different obstacles through a suitably selected transmitting time difference. In addition, the MIMO array antenna may also form a new virtual array antenna by the different placement locations of the antenna, thereby enhancing the angular resolution.

On the other hand, the phased array antenna uses a large number of independently controlled small antenna elements (typically referred to phase shifters) arranged on an antenna array surface, synthesizing the main lobes of different phases (directions) by controlling the transmitting time difference of each of the antenna elements. More specifically, an electromagnetic wave is transmitted by each of the phase shifters of the phased array antenna so as to strengthen the constructive interference and synthesize to one nearly straight radar main lobe, and the side lobes are significantly reduced due to the destructive interference. When operating the phased array antenna, the control system thereof may transmit a required lobe direction to a lobe control unit. Then, the lobe control unit may calculate the transmission time of the electromagnetic wave by each of the phase shifters and issue a command to the phase shifters, such that the electromagnetic wave emitted by each of the phase shifters interfere with each other to form the required lobe. Since a main lobe with higher gain may be produced, the phased array may achieve a longer detection distance.

Even though the MIMO array antenna and the phased array antenna have a high angular resolution and a long detection distance advantage respectively, the MIMO array antenna and the phased array antenna also have a shortcoming in a short detection distance and a low angular resolution respectively on the contrary. Therefore, if the features of the two kinds of antenna arrays may be integrated such that each of the antenna arrays may exert effects thereof at suitable timings, the performance of radar detection may be improved effectively.

SUMMARY OF THE INVENTION

Accordingly, the invention proposes radar including a MIMO array antenna and a phased array antenna, and having the features of the MIMO array antenna and the phased array antenna at the same time. The invention also proposes a method for switching to enable the array antenna, which may enable the more suitable array antenna corresponding to various different situations.

The invention provides radar including a transceiver, a MIMO array antenna, a phased array antenna and a controller. The MIMO array antenna is coupled with the transceiver, and includes a plurality of first transmitting sub-arrays and a plurality of receiving sub-arrays. The phased array antenna is coupled with the transceiver, and includes a plurality of second transmitting sub-arrays and the plurality of receiving sub-arrays. The controller is coupled with the transceiver and configured to switch to enable the first transmitting sub-arrays so as to enable the MIMO array antenna or to switch to enable the second transmitting sub-arrays so as to enable the phased array antenna.

The invention proposes a method for switching to enable an array antenna, adapted for a controller in radar including a MIMO array antenna and a phased array antenna. The method includes: determining whether a GPS signal is available; if yes, determining whether the radar is located on a particular road section according to the GPS signal; if yes, switching to enable the second transmitting sub-arrays so as to enable the phased array antenna.

Based on the above, the radar proposed in the embodiments of the invention is configured with a MIMO array antenna and a phased array antenna, and therefore having the features of both types of the array antenna at the same time, thereby improving on the shortcomings of a conventional radar only including one type of array antenna. In addition, the method proposed in the invention may switch to enable the MIMO array antenna or the phased array antenna according to whether a GPS signal is available and/or whether a moving speed of the radar is greater than a preset threshold, and therefore allowing the radar to use a more suitable array antenna to perform detection in response to various situations.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
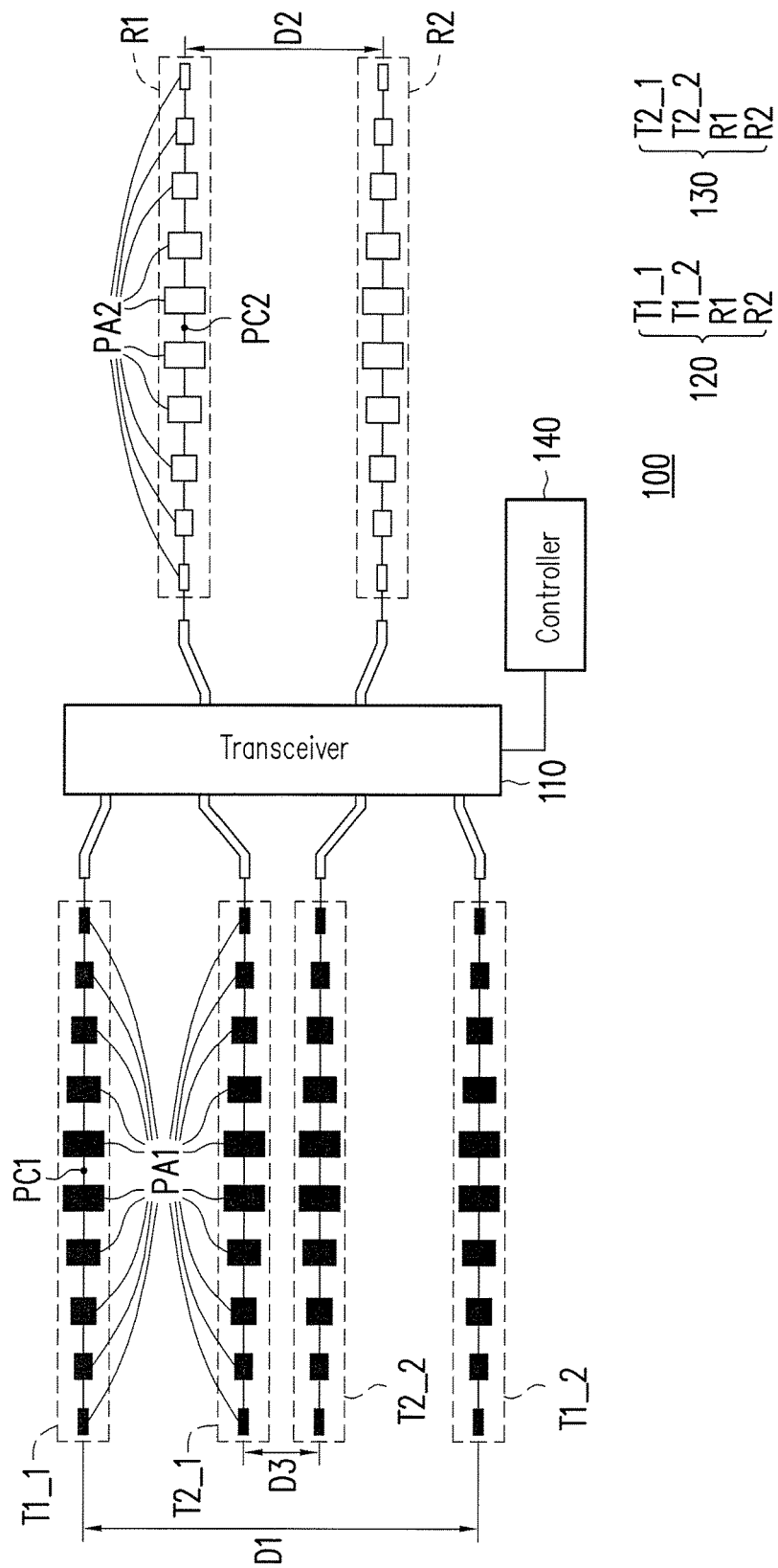
FIG. 1 is a schematic diagram of radar according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of radar according to an embodiment of the invention. In the present embodiment, radar 100 is, for example, car radar, military radar or other radar having similar use, but the invention is not limited thereto. The radar 100 includes a transceiver 110, a MIMO array antenna 120, a phased array antenna 130 and a controller 140. The transceiver 110 may include a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA) and/or a local storage medium and such components, and are used to process a signal transmitted through the MIMO array antenna 120 and the phased array antenna 130, or a signal received through the MIMO array antenna 120 and the phased array antenna 130.

The MIMO array antenna 120 may be, for example, implemented by a Butler matrix or other similar array antenna to form a beam, but the invention is not limited thereto. The MIMO array antenna 120 includes first transmitting sub-arrays T1_1, T1_2 and receiving sub-arrays R1 and R2 which are all coupled with the transceiver 110. The phased array antenna 130 includes second transmitting sub-arrays T2_1, T2_2 and the receiving sub-arrays R1 and R2 which are all coupled with the transceiver 110. In the present embodiment, the MIMO array antenna 120 and the phased array antenna 130 may transmit a signal through the respective transmitting sub arrays for detecting an obstacle, and share the receiving sub-arrays R1 and R2 to receive a signal reflected from the obstacle, but it should not be construed as a limitation to the invention. In addition, since the MIMO array antenna 120 includes two first transmitting sub-arrays T1_1, T1_2 and two receiving sub-arrays R1 and R2, it can be referred to as a 2×2 MIMO array antenna (namely, 2 transmitting antennas and 2 receiving antennas). Based on similar principles, the phased array antenna 130 may be referred to as a 2×2 phased array antenna.

The controller 140 coupled to the transceiver 110 is, for example, a general purpose processor, a special purpose processor, a conventional processor, a digital signal processor, a plurality of microprocessors, one or more digital signal microprocessor cores combined, a controller, a microcontroller, an application specific integrated circuit (ASIC), a field programmable gate array (FPGA), any other type of integrated circuit, a state machine, a processor based on an advanced RISC machine (ARM) and similar products. In the present embodiment, the controller 140 may access, for example, a program, a software or a module that are stored in a hard disk or a memory and such storage unit (not shown.), for switching to enable one of the first transmitting sub-arrays T1_1, T1_2 and the second transmitting sub-arrays T2_1, T2_2. When the controller 140 enables the first transmitting sub-arrays T1_1, T1_2, the radar 100 forms the MIMO array antenna 120. When the controller 140 enables the second transmitting sub-arrays T2_1, T2_2, the radar 100 forms the phased array antenna 130, in which the details thereof will be described later. First, the various embodiments of the structure of the radar 100 will be described below.

As shown in FIG. 1, the first transmitting sub-arrays T1_1, T1_2 and the second transmitting sub-arrays T2_1, T2_2 may be disposed on a first side (for example, a left side) of the transceiver 110, and the receiving sub-arrays R1 and R2 may be disposed on a second side (for example, a right side) of the transceiver 110. In the present embodiment, the first side is opposite to the second side. However. the first transmitting sub-arrays T1_1, T1_2, the second transmitting sub-arrays T2_1, T2_2 and the receiving sub-arrays R1 and R2 may also be disposed on a same side if the space is enough in other embodiments. In addition, the first transmitting sub-arrays T1_1, T1_2, the second transmitting sub-arrays T2_1, T2_2 and the receiving sub-arrays R1 and R2 may be disposed on an upper side, lower side, left side and right side in response to a pin configuration of the transceiver 110, but the embodiments of the invention are not limited thereto.

In the present embodiment, the first transmitting sub-arrays T1_1, T1_2 and the second transmitting sub-arrays T2_1, T2_2 include a plurality of first patch antennas PA1 aligned in a straight line respectively, and the receiving sub-arrays R1 and R2 include a plurality of second path antennas PA2 aligned in a straight line respectively. The first patch antennas PA1 are exemplarily shown as a plurality of black rectangles having different sizes, and the second patch antennas PA2 are exemplarily shown as a plurality of white rectangles having different sizes, but they are used for schematic purposes only and should not be construed as a limitation to the embodiments of the invention.

In the radar 100 of FIG. 1, the first transmitting sub-arrays T1_1, T1_2 and the second transmitting sub-arrays T2_1, T2_2 may be aligned parallel on a first plane, and a phase center of each of the first transmitting sub-arrays T1_1, T1_2 and each of the second transmitting sub-arrays T2_1, T2_2 may be aligned with each other. In the present embodiment, since a number of the first patch antennas PA1 included in each of the first transmitting sub-arrays T1_1, T12 and each of the second transmitting sub-arrays T2_1, T2_2 are, for example, 10, the phase centers of the aforementioned transmitting sub-arrays are all located between the 5th and the 6th first patch antennas PA1 counting from the left. That is, each phase centers is between the two largest black rectangles. Taking the first transmitting sub-arrays T1_1 as an example, the phase center PC1 thereof locates on the place labeled in FIG. 1. In addition, the receiving sub-arrays R1 and R2 may be aligned parallel on a second plane and the phase center (for example, the phase center PC2) of each of the receiving sub-arrays R1 and R2 may be aligned with each other.

In the present embodiment, the first transmitting sub-arrays T1_1, T1_2 are spaced apart by a first distance D1, and the adjacent receiving sub-arrays R1 and R2 are space apart by a second distance D2. In order to analyze the MIMO array antenna 120 as a virtual array antenna, the first distance D1 may be designed to be 2 times the second distance D2, but it should not be construed as a limitation to the invention. Under this circumstance, the 2×2 MIMO array antenna 120 may be analyzed as a 1×4 virtual array antenna. In addition, since the first transmitting sub-arrays T1_1, T1_2 are spaced further apart from each other, the second transmitting sub-arrays T2_1, T2_2 may be disposed between first transmitting sub-arrays T1_1, T1_2, such that the usage rate of the circuit area of the radar 100 may be increased. In addition, the second transmitting sub-arrays T2_1, T2_2 may be spaced apart by a third distance D3.

From another viewpoint, in the embodiment of FIG. 1, in order to analyze a conventional MIMO array antenna 120 as a virtual array antenna, a designer will design a distance between the first transmitting sub-arrays based on the number of receiving sub-arrays. Therefore, the distance between the first transmitting sub-arrays to be 2 times the distance that is between the receiving sub-arrays. Under this circumstance, the usage rate of the circuit area would be low. However, with the structure proposed in the embodiment of the invention, not only the usage rate of the circuit area of the radar 100 could be increased, but the radar 100 may simultaneously posses the features of the MIMO array antenna and the phased array antenna.

Figure 2:
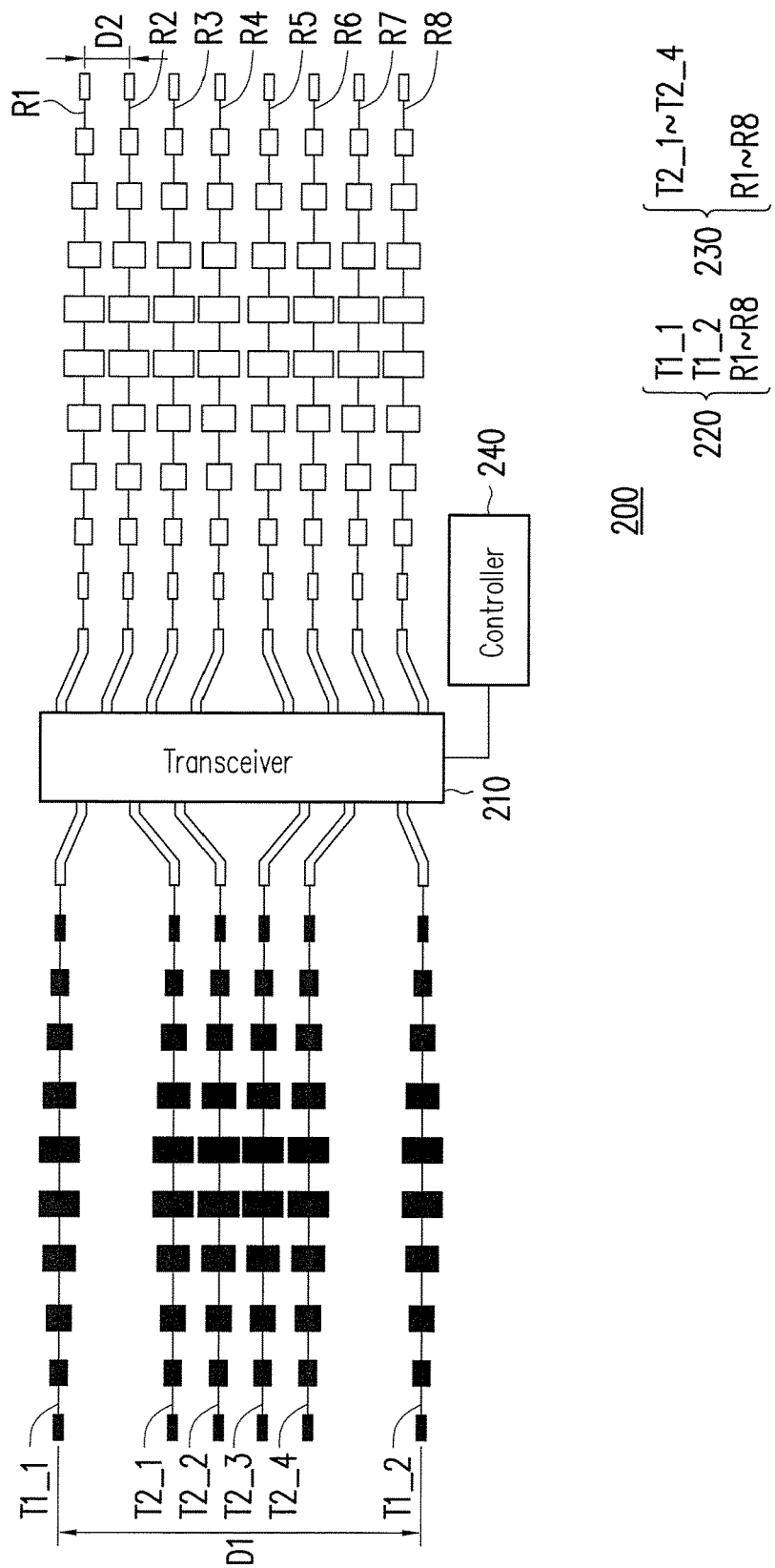
FIG. 2 is a schematic diagram of radar according to an embodiment of the invention.

In other embodiments, the radar proposed by the invention may also be implemented to have more transmitting sub-arrays and receiving sub-arrays. FIG. 2 is a schematic diagram of radar according to an embodiment of the invention. Referring to FIG. 2, radar 200 includes a transceiver 210, an MIMO array antenna 220, a phased array antenna 230 and a controller 240 in the present embodiment. The MIMO array antenna 220 includes first transmitting sub-arrays T1_1-T1_2 and receiving sub-arrays R1-R8 which are all coupled with the transceiver 210. The phased array antenna 230 includes second transmitting sub-arrays T2_1-T2_4 and receiving sub-arrays R1-R8 which are all coupled with the transceiver 210. In other words, the MIMO array antenna 220, for example, is a 2×8 (i.e., 2 transmitting antennas and 8 receiving antennas) MIMO array antenna, and the phased array antenna 230 is a 4×8 (i.e., 4 transmitting antennas and 8 receiving antennas) phased array antenna.

In the present embodiment, two of the first transmitting sub-arrays T1_1-T1_2 are spaced apart by the first distance D1, and two adjacent receiving sub-arrays in the receiving sub-arrays R1-R8 are space apart by the second distance D2. As mentioned in the embodiment of FIG. 1, in order to analyze the MIMO array antenna 220 as a virtual array antenna, the first distance D1 may be designed to be 8 times the second distance D2. Under this circumstance, the 2×8 MIMO array antenna 220 may be analyzed as a 1×16 (i.e., 1 transmitting antenna and 16 receiving antennas) virtual array antenna. In addition, since the first transmitting sub-arrays T1_1 and T1_2 are spaced further apart from each other, the second transmitting sub-arrays T2_1-T2_4 may be disposed between first transmitting sub-arrays T1_1 and T1_2, such that the circuit area of the radar 200 may be used more effectively. Compared to the configuration shown in FIG. 1, the structure proposed in the embodiment of FIG. 2 may further increase the usage rate of the circuit area of the radar 100.

Similar to the controller 140 of FIG. 1, the controller 240 coupled with the transceiver 210 in FIG. 2 may switch to enable one of the first transmitting sub-arrays T1_1-T1_2 and the second transmitting sub-arrays T2_1-T2_4. When the controller 240 enables the first transmitting sub-arrays T1_1-T1_2, the radar 200 forms the MIMO array antenna 220. When the controller 240 enables the second transmitting sub-arrays T2_1-T2_4, the radar 200 forms the phased array antenna 230. In other words, the radar 200 may have both the features of the MIMO array antenna and the phased array antenna.

Figure 3:
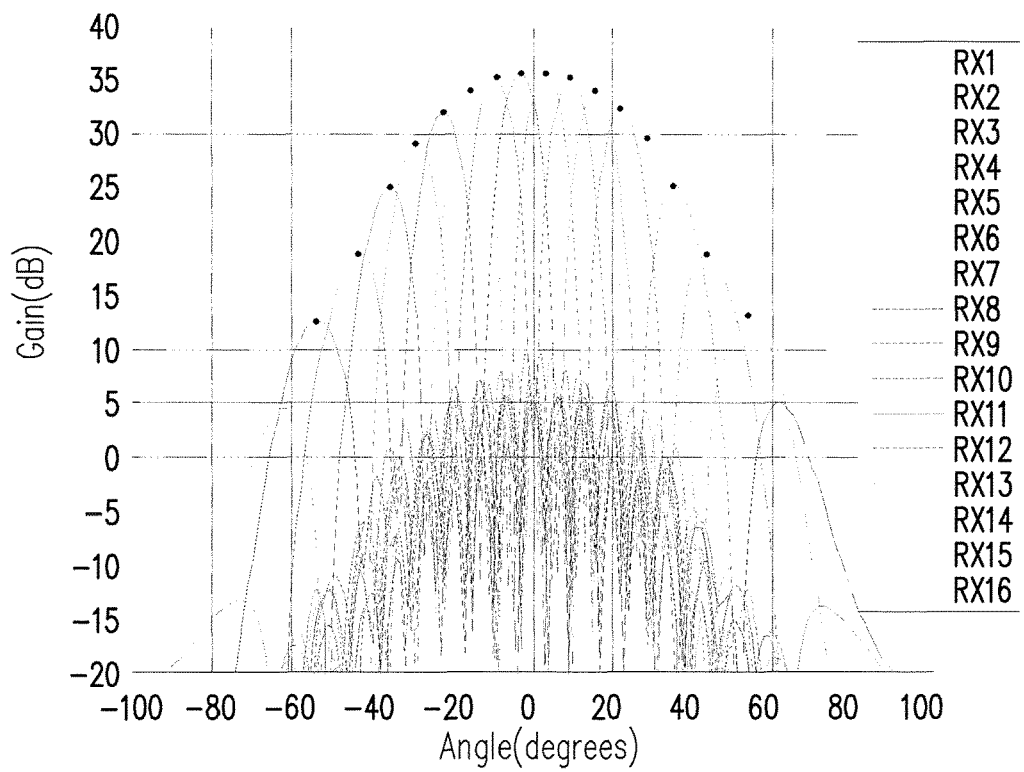
FIG. 3 is a diagram illustrating a radiation pattern of a virtual array antenna according to the embodiment of FIG. 2.

Referring to FIG. 3, FIG. 3 is a diagram illustrating a radiation pattern of a virtual array antenna according to the embodiment of FIG. 2. As presented in FIG. 2, the MIMO array antenna may be analyzed as a 1×16 virtual array antenna, and the antenna pattern corresponding to the 16 receiving sub-arrays of the virtual array antenna is the pattern RX1-RX16 exemplarily illustrated in FIG. 3. It may be seen clearly from FIG. 3 that there are approximately 16 distinct main lobes (namely, lobes labelled with black dots) between the angles of −60 to +60.

Figure 4:
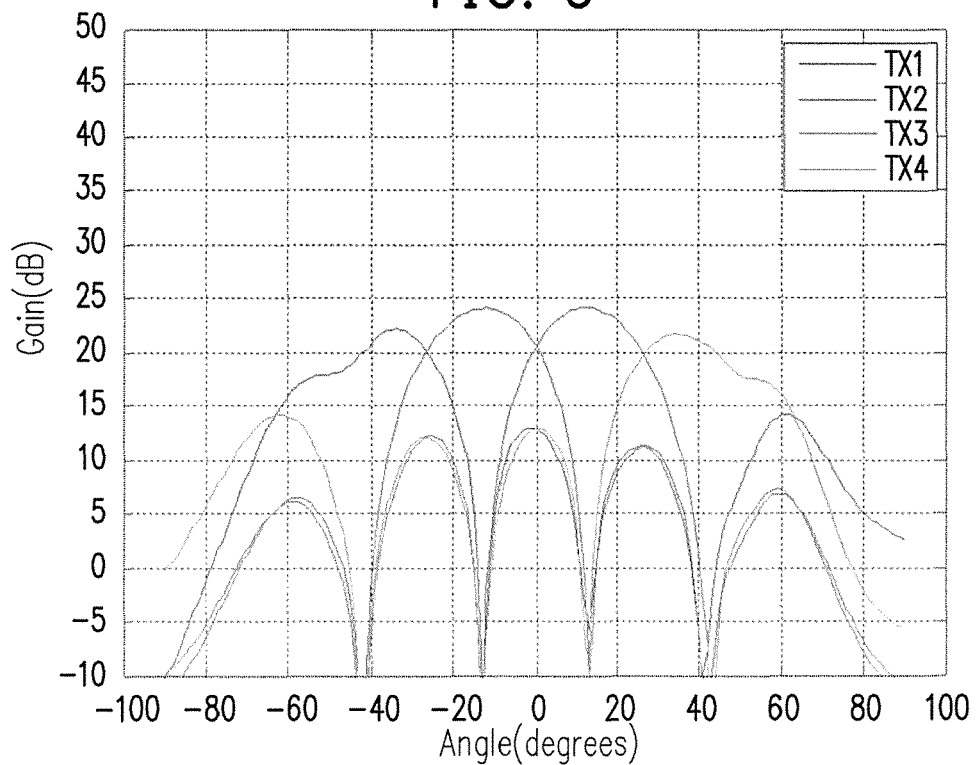
FIG. 4 is a diagram illustrating an antenna radiation pattern of a second transmitting sub array in a phased array antenna according to the embodiment of FIG. 2.
Figure 5:
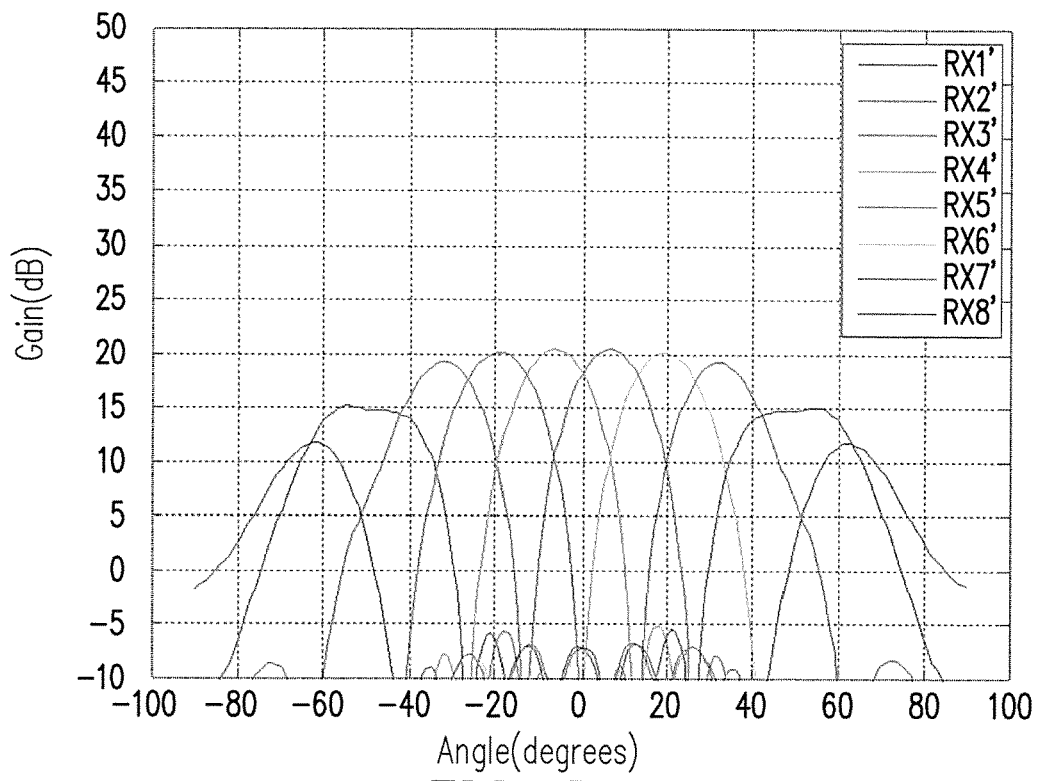
FIG. 5 is a diagram illustrating an antenna radiation pattern of a plurality of receiving sub-arrays according to the embodiments of FIG. 2 and FIG. 4.

FIG. 4 is a diagram illustrating an antenna radiation pattern of a second transmitting sub array in a phased array antenna according to the embodiment of FIG. 2. Referring to FIG. 4, the patterns TX1-TX4 are, for example, the antenna patterns of the second transmitting sub-arrays T2_1-T2_4 respectively when the phased array antenna 230 is enabled in the present embodiment. The second transmitting sub-arrays T2_1-T2_4 are horizontally polarized herein, and the output phase of the second transmitting sub-arrays T2_1-T2_4 may be changed to adjust the antenna pattern and suppress the side lobes. In this way, a plurality of lobes may be implemented on the horizontal plane and the antenna gain may be increased. In addition, since the second transmitting sub-arrays T2_1-T2_4 are transmitting at the same time, the scan angle may be changed, and the flexibility of the application may be enhanced. FIG. 5 is a diagram illustrating an antenna radiation pattern of a plurality of receiving sub-arrays according to the embodiments of FIG. 2 and FIG. 4. Referring to FIG. 5, in the present embodiment, the patterns RX1'-RX8' are the antenna patterns of the receiving sub-arrays R1-R8 when the phased array antenna 230 is enabled. Here, the antenna pattern may be adjusted and the side lobe may be suppressed by changing the strength and the desired phase of the signal received by the receiving sub-arrays R1-R8, and a broader scan range on the horizontal plane and a higher antenna gain may be achieved.

Figure 6:
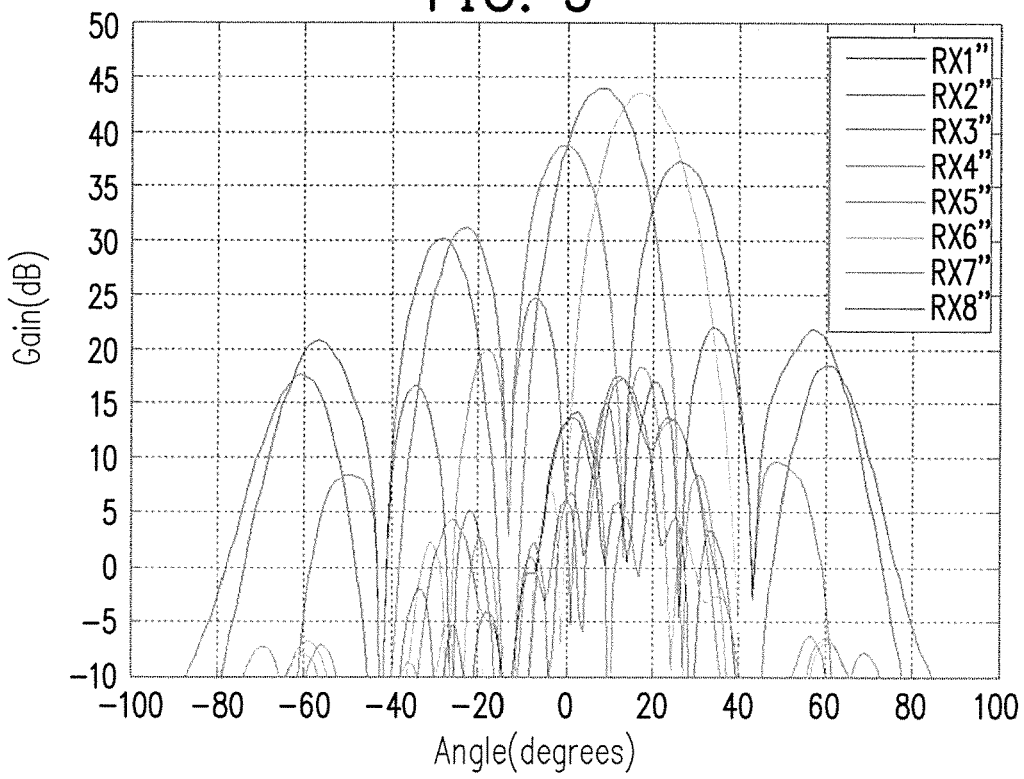
FIG. 6 is a diagram illustrating a two way pattern according to an embodiment of the invention.

FIG. 6 is a diagram illustrating a two way pattern according to an embodiment of the invention. Referring to FIG. 6, in the present embodiment, the patterns RX1"-RX8" combines the diagrams of the antenna radiation pattern of the second transmitting sub-arrays and the receiving sub-arrays respectively. From FIG. 6 it may be observed that there is a distinct main lope located between 0 degrees and 20 degrees, which represents that the antenna radiation pattern and the antenna gain may be optimized by selecting the radiation pattern of the second transmitting sub-arrays, thereby increasing the detection range and the signal-to-noise ratio.

As mentioned previously, the controller 140 may access, for example, a program, a software or a module that are stored in a storage unit such as (not shown) a hard disk or a memory for switching to enable the first transmitting sub-arrays T1_1 and T1_2 so as to form the MIMO array antenna 120, or for switching to enable the second transmitting sub-arrays T2_1 and T2_2 so as to form the phased array antenna 130. Detailed description is provided below.

Figure 7:
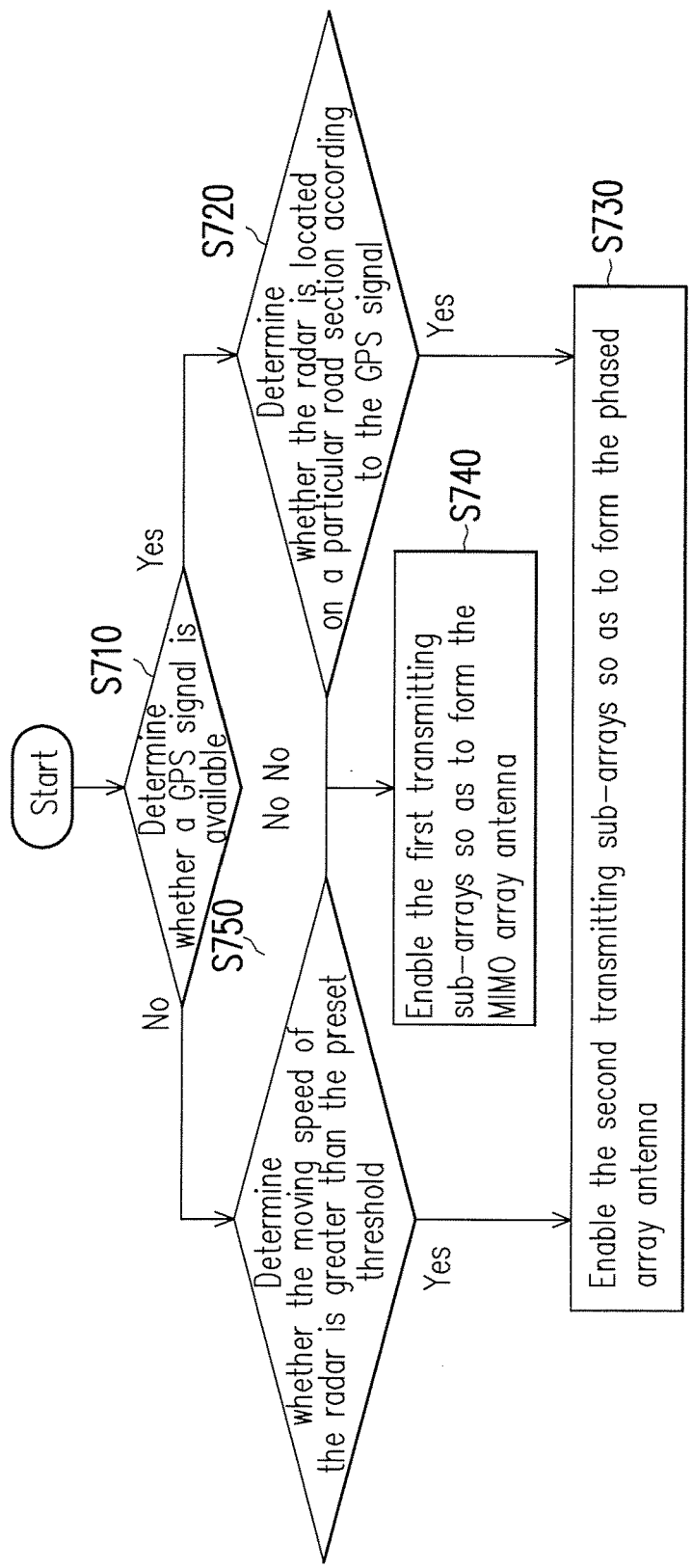
FIG. 7 illustrates a method for switching to enable an array antenna according to an embodiment of the invention.

FIG. 7 illustrates a method for enabling an array antenna according to an embodiment of the invention. The method proposed in the present embodiment may be executed by the radar 100 of FIG. 1, and details of each of the step will be described accompanied by each of the components of FIG. 1 below. In order to facilitate the explanation of the concept of the embodiment, the radar 100 is presumed to be disposed around a vehicle, and is used to detect other vehicles or obstacles surrounding the vehicle, but the invention is not limited thereto.

First, in step S710, the controller 140 may determine whether a GPS signal is available. If yes, that is, the GPS signal is available, the controller 140 may determine whether the radar 100 is located on a particular road section according to the GPS signal in a step S720. In other embodiments, the particular road section may be a high way, an express road or a road with low traffic (for example, an interstate highway), but it should not be construed as a limitation to the invention. If the controller 140 determines the radar 100 is located on a particular road section, it represents that a distance between the vehicle and other surrounding vehicles (or obstacles) may be far, and therefore the controller 140 may proceed to step S730 to enable the second transmitting sub-arrays T2_1-T2_2 so as to form the phased array antenna 130. In this way, the radar 100 may detect farther obstacles or other vehicles.

However, if the controller 140 determines the radar 100 is not located on a particular road section in the step S720, it represents that the radar 100 and the vehicle may be located in downtown or other areas with dense traffic. Therefore, the controller 140 may proceed to step S740 to enable the first transmitting sub-arrays T1_1-T1_2 so as to form the MIMO array antenna 120. In this way, the radar 100 may more accurately detect other surrounding vehicles or obstacles with a higher angular resolution.

On the other hand, if the controller 140 determines the GPS signal is unavailable in step S710, it represents that the controller 140 may (temporarily) be unable to determine enabling which array antenna according to the location of the radar 100 and the vehicle. Therefore, in step S750, the controller 140 may determine whether a moving speed of the radar 100 (namely, the moving speed of the vehicle) is greater than a preset threshold. The preset threshold is, for example, the road speed limit of a typical urban road (for example, 40 km/h), but it should not be construed as a limitation to the invention. Under this circumstance, if the moving speed of the radar 100 is greater than the road speed limit, it represents that the radar 100 may be located on the highway, the express road or the interstate highway with a low car traffic, therefore the controller 140 may enable the second transmitting sub-arrays T2_1-T2_2 so as to form the phased array antenna 130 in the step S730. In this way, the radar 100 may detect distant obstacles or other vehicles.

However, if the moving speed of the radar 100 is not greater than the preset threshold, it represents that the vehicle may be located on an urban road with a higher car traffic, and therefore the controller 140 may enable the first transmitting sub-arrays T1_1-T1_2 so as to form the MIMO array antenna 120 in step S740. In this way, the radar 100 may more accurately detect other surrounding vehicles or obstacles with a higher angular resolution.

In other embodiments, the controller 140 may execute the method of FIG. 7 regularly or irregularly, so as to adaptively determine the desired array antenna to enable according to the GPS signal or the immediate moving speed of the radar 100. In addition, when the controller 140 determines the radar is located on the particular road section, the controller 140 also may further determine whether the moving speed of the radar 100 is greater than another preset threshold. The another preset threshold, for example, is the average speed on the highway, the express way or the interstate highway, or other speed set by the designer (for example, 50 km/h), however it should not be construed as a limitation to the invention. Under this circumstance, if the controller 140 determines the radar 100 is located on the particular road section or when the immediate moving speed of the vehicle is not greater than the another preset threshold, it is representative that a traffic congestion may have occurred. At this time, the controller 140 also may enable the first transmitting sub-arrays T1_1-T1_2 so as to form the MIMO array antenna 120. In this way, the radar 100 may use a higher angular resolution to accurately detect other surrounding vehicles or obstacles.

In another embodiment, when the controller 140 enables the MIMO array antenna 120, the second transmitting sub-arrays T2_1-T2_2 are disabled so as to disable the phased array antenna 130 at the same time. On the other hand, when the controller 140 enables the phased array antenna 130, the first transmitting sub-arrays T1_1-T1_2 are disabled so as to disable the MIMO array antenna 120 at the same time.

A person skilled in the art may understand that although only the radar 100 of FIG. 1 is used as an example to describe the details of FIG. 7, but the method of FIG. 7 may be adapted for the radar 200 shown in FIG. 2, or other similar radars.

Figure 8A:
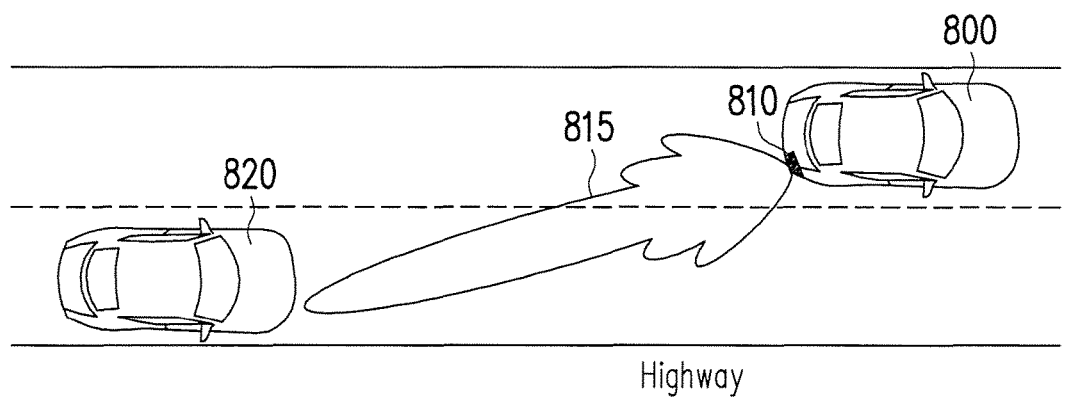
FIG. 8A is a schematic diagram illustrating when a radar is located at a particular road section and detecting other vehicles according to an embodiment of the invention.

FIG. 8A is a schematic diagram illustrating when a radar is located at a particular road section and detecting other vehicles according to an embodiment of the invention. Referring to FIG. 8A, in the present embodiment, a radar 810 may be exemplarily disposed as shown in FIG. 8A, namely the right rear side of a vehicle 800. It may be seen from FIG. 8A that when the vehicle 800 is located on the particular road section of the highway, the radar 810 may enable the phased array antenna (not shown) thereof, so as to detect other farther vehicles (e.g. a vehicle 820) by using a pattern 815 with a distinct main lobe.

Figure 8B:
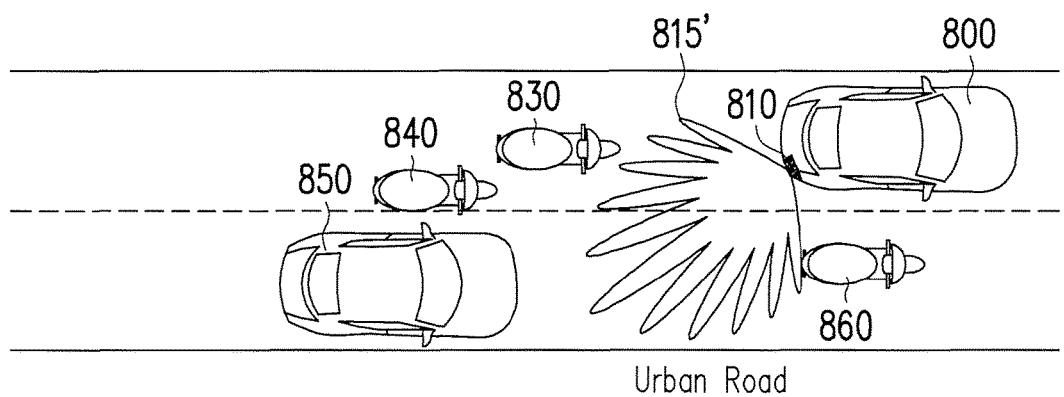
FIG. 8B is a schematic diagram illustrating when a radar is not located at a particular road section and detecting other vehicles according to the embodiment of FIG. 8A.

FIG. 8B is a schematic diagram illustrating when a radar is not located at a particular road section and detecting other vehicles according to the embodiment of FIG. 8A. Referring to FIG. 8B, in the present embodiment, when the vehicle 800 is located on the locations not belonging to the particular road section, such as the urban road, the radar 810 may enable the MIMO array antenna (not shown) thereof, so as to more accurately detect other vehicles at a closer distance (for example, vehicles 830-860) by using a pattern 815' with a higher angular resolution.

In summary, the radar proposed in the embodiments of the invention is configured with a MIMO array antenna and a phased array antenna and therefore having the features of both types of the array antenna, thereby improving on the shortcomings of a conventional radar only including one type of array antenna. In addition, through a suitable structure design, the radar proposed in the invention may use the circuit area more effectively. Furthermore, the method proposed in the invention may enable the MIMO array antenna or the phased array antenna according to whether a GPS signal is available and/or whether a moving speed of the radar is greater than a preset threshold, and therefore allowing the radar to use a more suitable array antenna to perform detection in response to various situations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A radar, comprising:
   a transceiver;
   a MIMO array antenna coupled with the transceiver, and comprising a plurality of first transmitting sub-arrays and a plurality of receiving sub-arrays;
   a phased array antenna coupled with the transceiver, and comprising a plurality of second transmitting sub-arrays and the plurality of receiving sub-arrays, wherein the first transmitting sub-arrays and the second transmitting sub-arrays comprises a plurality of first patch antennas aligned in a straight line respectively, and the receiving sub-arrays comprises a plurality of second patch antennas aligned in a straight line respectively, wherein the first transmitting sub-arrays and the second transmitting sub-arrays are disposed on a first side of the transceiver, and the receiving sub-arrays are disposed on a second side of the transceiver, wherein the first side is opposite to the second side; and a controller coupled with the transceiver and configured to enable the first transmitting sub-arrays so as to form the MIMO array antenna or to enable the second transmitting sub-arrays so as to form the phased array antenna.

2. The radar as claimed in claim 1, wherein the first transmitting sub-arrays and the second transmitting sub-arrays are aligned parallel on a first plane, and a phase center of each of the first transmitting sub-arrays and each of the second transmitting sub-arrays are aligned with each other, wherein the receiving sub-arrays are aligned parallel on a second plane, and a phase center of each of the receiving sub-arrays are aligned with each other, wherein two of the first transmitting sub-arrays are spaced apart by a first distance, and two adjacent receiving sub-arrays in the receiving sub-arrays are spaced apart by a second distance, wherein the first distance is N times the second distance and N is the number of receiving sub-arrays.

3. The radar as claimed in claim 1, wherein the second transmitting sub-arrays are disposed between any two of the first transmitting sub-arrays.

4. The radar as claimed in claim 3, wherein the controller is configured to determine whether a GPS signal is available, wherein if the GPS signal is available, the controller determines whether the radar is located on a particular road section according to the GPS signal, and if the radar is located on the particular road section, the controller enables the second transmitting sub-arrays so as to form the phased array antenna.

5. The radar as claimed in claim 4, wherein if the radar is not located on the particular road section, the controller enables the first transmitting sub-arrays so as to form the MIMO array antenna.

6. The radar as claimed in claim 4, wherein if the GPS signal is unavailable, the controller is configured to determine whether a moving speed of the radar is greater than a preset threshold, and if the moving speed of the radar is greater than the preset threshold, the controller enables the second transmitting sub-arrays so as to form the phased array antenna.

7. The radar as claimed in claim 6, wherein if the moving speed is not greater than the preset threshold, the controller enables the first transmitting sub-arrays so as to form the MIMO array antenna.

8. A method for enabling an array antenna, used in a radar, the radar comprising a MIMO array antenna, a phased array antenna and a controller, wherein the MIMO array antenna comprises a plurality of first transmitting sub-arrays, the phased array antenna comprises a plurality of second transmitting sub-arrays, and the method comprising:

determining whether a GPS signal is available;
if the GPS signal is available, determining whether the radar is located on a particular road section according to the GPS signal;
if the GPS signal is unavailable, determining whether a moving speed of the radar is greater than a preset threshold;
if the moving speed of the radar is greater than the preset threshold, enabling the second transmitting sub-arrays so as to form the phased array antenna.

9. The method as claimed in claim 8, wherein if the radar is not located on the particular road section, the method further comprises:

enabling the first transmitting sub-arrays so as to form the MIMO array antenna.

10. The method as claimed in claim 8, wherein if the moving speed is not greater than the preset threshold, the method further comprises:

enabling the first transmitting sub-arrays so as to form the MIMO array antenna.

11. A method for enabling an array antenna, used in a radar, the radar comprising a MIMO array antenna, a phased array antenna and a controller, wherein the MIMO array antenna comprises a plurality of first transmitting sub-arrays, the phased array antenna comprises a plurality of second transmitting sub-arrays, and the method comprising:

determining whether a GPS signal is available;
if the GPS signal is available, determining whether the radar is located on a particular road section according to the GPS signal;
if the radar is located on the particular road section, enabling the second transmitting sub-arrays so as to form the phased array antenna;
if the radar is not located on the particular road section, enabling the first transmitting sub-arrays so as to form the MIMO array antenna.

12. The method as claimed in claim 11, wherein if the GPS signal is unavailable, the method further comprises:

determining whether a moving speed of the radar is greater than a preset threshold;
if the moving speed of the radar is greater than the preset threshold, enabling the second transmitting sub-arrays so as to form the phased array antenna.

13. The method as claimed in claim 12, wherein if the moving speed is not greater than the preset threshold, the method further comprises:

enabling the first transmitting sub-arrays so as to form the MIMO array antenna.

* * * * *